US012643573B2

(12) United States Patent
Boller et al.

(10) Patent No.:     US 12,643,573 B2
(45) Date of Patent:          Jun. 2, 2026

(54) ACCESSIBILITY DISCOVERY, ASSESSMENT, AND RECOMMENDATION FOR VEHICLE CHARGING LOCATIONS AND OTHER REQUESTED DESTINATIONS

(71) Applicant: GM GLOBAL TECHNOLOGY OPERATIONS LLC, Detroit, MI (US)

(72) Inventors: Sheryl Boller, Trenton, MI (US); Maryssa Lynn Weir, West Bloomfield, MI (US); Mary Gilliam, Farmington Hills, MI (US); Derek Hunter, Ann Arbor, MI (US); Frank Vu, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 112 days.

(21) Appl. No.: 18/618,385

(22) Filed: Mar. 27, 2024

(65) Prior Publication Data

US 2025/0304116 A1      Oct. 2, 2025

(51) Int. Cl.
| | |
|---|---|
| *B60W 60/00* | (2020.01) |
| *G01C 21/36* | (2006.01) |
| *G06Q 10/02* | (2012.01) |

(52) U.S. Cl.
CPC ....... *B60W 60/0025* (2020.02); *G01C 21/367* (2013.01); *G01C 21/3679* (2013.01); *G06Q 10/02* (2013.01); *B60W 2540/043* (2020.02); *B60W 2556/50* (2020.02)

(58) Field of Classification Search
CPC ....... B60W 60/0025; B60W 2540/043; B60W 2556/50; G01C 21/367; G01C 21/3679; G01C 21/343; G01C 21/3476; G01C 21/3438; G01C 21/3461; G06Q 10/02; B60L 53/00; G05D 1/243; G05D 1/246; G05D 1/43; G05D 1/633; G05D 1/65;

(Continued)

(56) References Cited

U.S. PATENT DOCUMENTS

| | | | |
|---|---|---|---|
| 10,876,854 B2 | 12/2020 | Oh | |
| 11,402,223 B1 * | 8/2022 | Grealish-Rust | .... G01C 21/3685 |
| 2003/0201890 A1 | 10/2003 | Bundy, IV | |

(Continued)

OTHER PUBLICATIONS

German Office Action from counterpart DE1020241131705, dated Oct. 18, 2024.

*Primary Examiner* — Ramya P Burgess
*Assistant Examiner* — Preston Jay Miller

(57)          ABSTRACT

A vehicle system includes a transceiver that collects source data from sources. An accessibility module: receives a request for a final destination from a user; determine a route from a current location to the final destination; obtains user criteria information for features of destinations along the route; collects the source data via the transceiver and regarding the features of the destinations; based on the source data and the user criteria information, scores each of the destinations to generate scores; based on the scores, displays a heat map and a recommendation to the user, where the heat map is indicative of the scores respectively of the destinations, and where the scores are specific to the user; and receives an input selecting one of the destinations. A vehicle control module, based on the selected destination, guides the user to or autonomously drives the vehicle to the selected destination.

20 Claims, 12 Drawing Sheets

(58) Field of Classification Search
CPC ............ G05D 2105/10; G06F 16/9535; G06F
16/9537
USPC ........................................................ 701/25
See application file for complete search history.

(56) References Cited

U.S. PATENT DOCUMENTS

| | | | | |
|---|---|---|---|---|
| 2010/0179754 | A1* | 7/2010 | Faenger | G06F 16/9537 |
| | | | | 701/532 |
| 2015/0306969 | A1* | 10/2015 | Sabripour | H02J 3/322 |
| | | | | 320/109 |
| 2017/0118307 | A1* | 4/2017 | Beaurepaire | H04W 4/40 |
| 2019/0178677 | A1* | 6/2019 | Oh | G06F 16/951 |
| 2020/0262307 | A1* | 8/2020 | Rosene | H04L 67/52 |
| 2021/0213844 | A1* | 7/2021 | Singuru | B60L 53/62 |
| 2021/0364311 | A1* | 11/2021 | Baig | G01C 21/3679 |
| 2022/0397408 | A1* | 12/2022 | Bahnsen | G01C 21/3484 |
| 2024/0211522 | A1* | 6/2024 | Allamsetty | G06F 16/24556 |

* cited by examiner

1200

1200

ACCESSIBILITY DISCOVERY, ASSESSMENT, AND RECOMMENDATION FOR VEHICLE CHARGING LOCATIONS AND OTHER REQUESTED DESTINATIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle guidance systems, and more particularly, to accessibility systems utilized when traveling.

Hybrid electric vehicles ("HEVs") and electric vehicles ("EVs") include battery packs, which need to be periodically charged. This charging may occur using charging apparatuses at charging stations. Charging stations exist at residential homes, at businesses, at fleet charging locations, and at commercial charging locations.

Charging apparatuses are employed for charging batteries in hybrid and electric vehicles. The charging apparatuses typically include a cable electrically connected to a power source and a plug electrically connected to the cable. The plug may be inserted into a charging port of an electric vehicle. After insertion, the power source provides electric power to the charging port via the cable to charge the batteries of the vehicle.

SUMMARY

A vehicle system of a vehicle is disclosed. The vehicle system includes a transceiver, an accessibility module, and a vehicle control module. The transceiver is configured to communicate with a distributed communications network to collect source data from sources. The accessibility module is configured to: receive a request for a final destination from a user; determine a route from a current location to the final destination; obtain user criteria information for features of destinations along the route; collect the source data via the transceiver and regarding the features of the destinations; based on the source data and the user criteria information, score each of the destinations to generate scores; based on the scores, generate and display a heat map and a recommendation to the user, where the heat map is indicative of the scores respectively of the destinations, and where the scores are specific to the user; and receive an input selecting one of the destinations. The vehicle control module is configured, based on the selected destination, to at least one of guide the user to the selected destination or autonomously drive the vehicle to the selected destination.

In other features, the destinations include charging stations. In other features, the accessibility module is configured to: access accessibility features from online sources including websites of the destinations, community and social media websites, websites containing satellite and street view images, and crowd sourcing websites; implement machine learning and natural language processing to evaluate images, comments and reviews, and website text information associated with the accessibility features; generate accessibility profiles of the destinations based on results of the machine learning and natural language processing; and generate the recommendation to the user for one of the destinations based on the generated accessibility profiles.

In other features, the accessibility module is configured, when collecting the source data, to perform an artificial intelligence machine learning process that searches the sources on the Internet to automatically identify and access the features of at least one of i) the destinations, and ii) locations of the destinations.

In other features, the source data includes images, reviews, online information, website information, vehicle telematics data, and vehicle camera data.

In other features, the accessibility module is configured to generate an accessibility profile for each of the destinations using machine vision and natural language processing of the source data.

In other features, the accessibility module is configured to match a user accessibility profile of user preferences to charging station accessibility profiles in vicinities of possible target destinations along the route, and, based on how well the charging station accessibility profiles match the user preferences of the user accessibility profile, generate recommendations for charging stations at least one of nearby and along the route.

In other features, each of the charging station accessibility profiles includes i) user priority rankings for the features of a corresponding charging station, ii) station profile status indicators, and iii) feature scores.

In other features, the accessibility module is configured to update user accessibility profile assessments and a station location accessibility profile database based on user feedback and periodic searches for the source data.

In other features, the destinations include hotels, restaurants, rest areas, stores, shopping malls; and shopping centers. The accessibility module is configured to generate a recommended accessible travel itinerary based on accessibility profiles of the destinations.

In other features, the accessibility module is configured to implement machine learning and natural language processing to assess functionality and identify quality issues with one or more of the destinations, and generate the recommendation to at least one of i) not include the one or more of the destinations, ii) indicate issues of the one or more of the destinations, and iii) providing a low score for the one or more of the destinations.

In other features, the accessibility module is configured to apply a filter to block a recommendation for a charging station that is down for maintenance.

In other features, the accessibility module is configured to generate the recommendation for one of the destinations based on estimated mileage to the final destination and a state of charge of a power source of the vehicle.

In other features, the accessibility module is configured to make a reservation at the selected destination for the user prior to or while the user is traveling along the route to the selected destination.

In other features, the selected destination is a charging station, and the reservation is for a parking spot at which the vehicle is to be charged.

In other features, the accessibility module is configured to generate a customizable accessible travel itinerary for the user based on accessibility scores of places along the route specified by the user.

In other features, the accessibility module is configured to make reservations at the places based on a travel schedule and confirmation from the user.

In other features, a vehicle system of a vehicle is disclosed. The vehicle system includes a transceiver, an accessibility module, and a vehicle control module. The transceiver is configured to communicate with a distributed communications network to collect source data from sources for charging stations. The accessibility module is configured to: receive a request for a final destination from a user; determine a route from a current location to the final destination, obtain user criteria information for features associated with the charging stations; collect the source data via the transceiver and regarding the features; based on the source data and the user criteria information, score each of the charging stations to generate scores; based on the scores, generate and display a recommendation to the user; and receive an input selecting one of the charging stations. The vehicle control module is configured, based on the selected charging station, to at least one of guide the user to the selected charging station or autonomously drive the vehicle to the selected charging station.

In other features, the accessibility module is configured to: access accessibility features from online sources including websites of the charging stations, community and social media websites, websites containing satellite and street view images of the charging stations, and crowd sourcing websites; implement machine learning and natural language processing to evaluate images, comments and reviews, and website text information associated with the accessibility features; generate accessibility profiles of the charging stations based on results of the machine learning and natural language processing; and generate the recommendation to the user for one of the charging stations based on the generated accessibility profiles.

In other features, the accessibility module is configured to match a user accessibility profile of user preferences to charging station accessibility profiles in vicinities of possible target destinations along the route, and, based on how well the charging station accessibility profiles match the user preferences of the user accessibility profile, generate recommendations for charging stations at least one of nearby and along the route.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
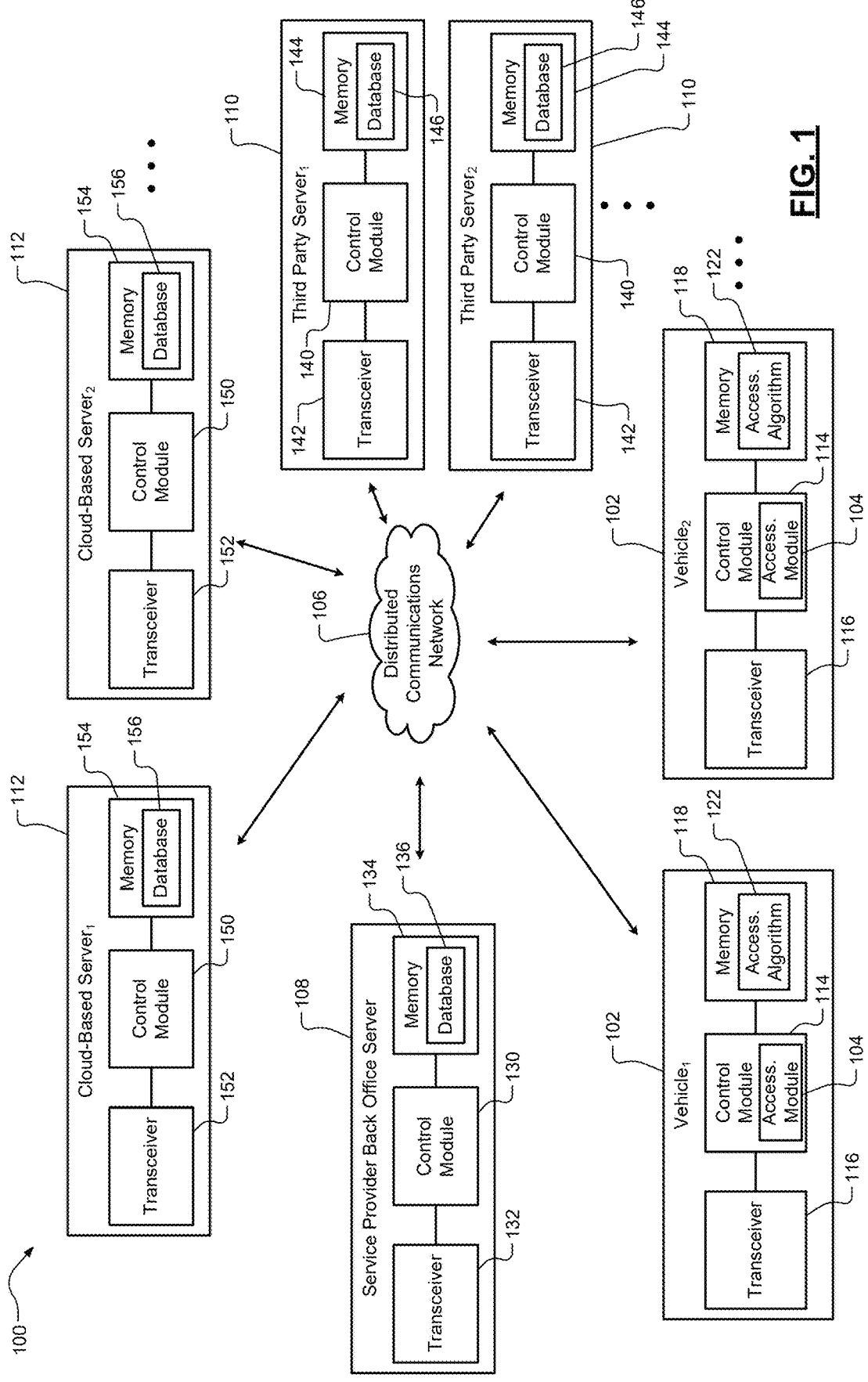
FIG. 1 is a functional block diagram of an accessibility system in accordance with the present disclosure.

Electric vehicle charging apparatuses at commercial charging stations typically include a plug electrically connected to a power source via a cable. Commercial charging stations refer to stations that charge fees for charging and are publicly accessible along travel routes. After arriving at a commercial charging station, a user is tasked with locating an available and working charger, parking the vehicle, exiting the vehicle, and inserting the charging plug of the charger into a charging port of a vehicle. This can include physical actions including reading a charger screen, grasping and pulling a charge cable towards the vehicle, aligning the plug with the charging port, and inserting the plug into the charging port. Such physical actions can often be difficult, particularly for individuals with disabilities (e.g., individuals with sight impairment, individuals in a wheelchair, and individuals that are color blind, etc.). For example, some individuals with dexterity issues and/or individuals using assistive mobility devices (such as wheelchairs, walkers, canes, etc.) can have difficulties moving the cable due to its weight and/or reaching the cable and extending it to the vehicle. Those that are sight impaired and/or color blind may have difficulty reading a small screen and/or a screen displaying different colors, such as red and green colors.

Commercial charging stations can have many different features including parking space widths and lengths, aisle widths, vehicle barriers, signs, parking spot markings (e.g., handicap marking, parking spot borders, etc.), heights and lengths of charging cables, charging cable locations, sign heights, charger screen sizes, charger screen parameters (e.g., clarity, brightness, contrast ratio, etc.), whether there is an attendant for help, etc. The features may include whether there are restrooms at the commercial charging station, whether the commercial charging stations is pet friendly (e.g., pets are permitted on premises, there are grassy locations, etc.), whether there is a restaurant nearby, whether there is one or more stores nearby, etc. Some other example features are mentioned below.

The examples set forth herein include accessibility systems including implementation of an accessibility algorithm according to an accessibility model. The accessibility algorithm is an artificial intelligence (AI) machine learning (ML) algorithm. As used herein, the term "accessibility" refers to: size of parking spot for charging a host vehicle; ingress ease for host vehicle entering parking spot; whether the charger plug is easy to access and plug in to host vehicle, ease in visibility and readability of charger screen, ease in physically reaching charger screen, whether the charger has talk-to-text feature, whether an attendant is available on site to help, whether there are long charge chords at site, whether there are height and reach issues, the weight of charge cables, etc. Accessibility may refer to these types of accessibility features and other types of accessibility features. Accessibility may refer to accessibility at a commercial charging station or accessibility at other venues, such as restaurants, hotels, shopping stores, malls, and/or centers, etc. Accessibility for these other venues may include: ease of parking, ease of ingress to and egress from the venue including vehicle ingress and egress and user ingress and egress, wheelchair accessibility, etc. Accessibility may refer to whether a hotel has pool access for an individual in a wheelchair, whether the hotel has wheelchair access to a certain floor, whether the hotel has handicap restrooms to accommodate impaired individuals, etc. The accessibility model is based on machine vision (MV) and natural language processing (NLP). The accessibility algorithm analyzes: user specific and requested features; user prioritization values for the user requested features; and features of charging stations. Based on this information, the accessibility algorithm generates a user profile and charging station accessibility profiles and ranks the charging stations for the user and provides accessibility scores respectively for the charging stations.

The accessibility scores are determined based on the accessibility profiles of the charging stations including the stated features. The features may further include: whether there are accessibility symbols in the parking spaces where charging occurs; size of parking spaces where charging occurs; accessibility of user interface and charging port; whether height and reach requirements are satisfied; etc. The accessibility scores may also be based on accessibility profiles of the user and how closely the accessibility profiles of the charging stations match the user accessibility profile. Data is obtained from multiple sources including from physical vehicle hardware (vehicle sensors including vehicle cameras), online images, online text, charging station websites, crowd sourcing websites, blogs, online chats, etc. Accessibility scores may be generated for charging stations, hotels, shopping centers, restaurants, rest areas, and/or other publicly accessible locations.

The accessibility algorithm searches for relevant information from a wide variety of sources on the Internet including on various websites to automatically identify and assess the accessibility features of possible target locations (or possible destinations). This may include creating an accessibility profile for an electric vehicle charging station using: MV processing of images, NLP of online reviews and other online information; vehicle telematics data including vehicle-to-everything (V2X), data from vehicle sensors; data from streetlights and/or other local stations, etc. The accessibility data collected and assessed herein includes sensory data, physical data, digital data, and other data.

In an embodiment, a user's accessibility profile is matched based on user specified preferences for charging station accessibility in the vicinity of a target destination or along a route to a final target end destination. Recommendations for charging stations nearby or along a route are generated based on the stated user and charging station profiles.

User accessibility profile assessments and station location accessibility profile databases are updated based on user feedback and periodic searches for most recent information. The accessibility algorithm for creating accessibility profiles can be applied to hotels, restaurants, and other places around a destination or along a route to create a recommended accessibility-based travel itinerary for a user.

Figure 11:
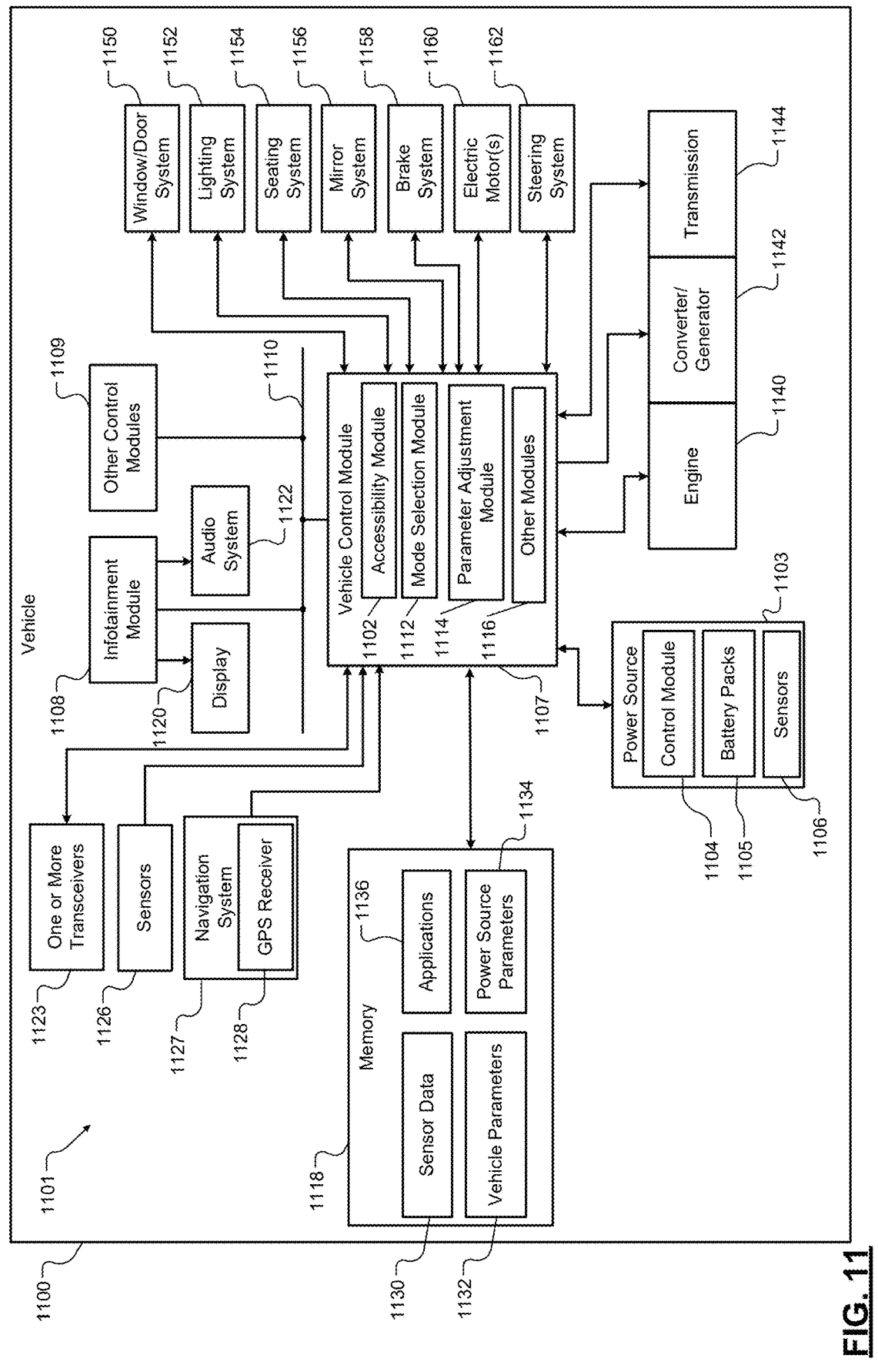
FIG. 11 is a functional block diagram of an example vehicle including a vehicle control system with an accessibility module in accordance with the present disclosure.

FIG. 1 shows an accessibility system 100 that includes vehicles 102 with accessibility modules 104, a distributed communications network 106, a service provider back-office server 108, third party servers 110, and cloud-based servers 112. The cloud-based servers 112 may include the servers 108, 110 and/or other servers. The vehicles 102 include control modules 114, transceivers 116, and memories 118. A more detailed example of a vehicle is shown in FIG. 11. The control modules 114 include accessibility modules 104 that execute accessibility algorithms 122, which are stored in the memories 118.

The service provider back-office server 108 includes a control module 130, a transceiver 132, and a memory 134 that stores a database 136. Third party servers 110 include control modules 140, transceivers 142, and memories 144 that store databases 146. The cloud-based servers 112 includes control modules 150, transceivers 152, and memories 154 that store databases 156.

The accessibility modules 104 may access data regarding possible destinations from any of the servers 108, 110, 112. This data may be stored in the databases 136, 146, 156. The data may include website data, online chats/conversations about the destinations, customer comments regarding the destinations, reviews of the destinations, blogs regarding the destinations, etc. The data may also include images of the destinations and/or images of features provided at the destinations.

In an embodiment, profiles of charging stations and other destinations are generated by the accessibility modules 104 of the vehicles 102. In another embodiment, the profiles of the charging stations are generated offboard at one or more of the servers 108, 110, 112 and then provided to the vehicles 102. The vehicles 102 may communicate with each other (referred to as vehicle-to-vehicle (V2V) communication). This communication may include information regarding destinations, such as any of the information referred to herein including status (or availability) and/or descriptions of features of the destinations.

Figure 2:
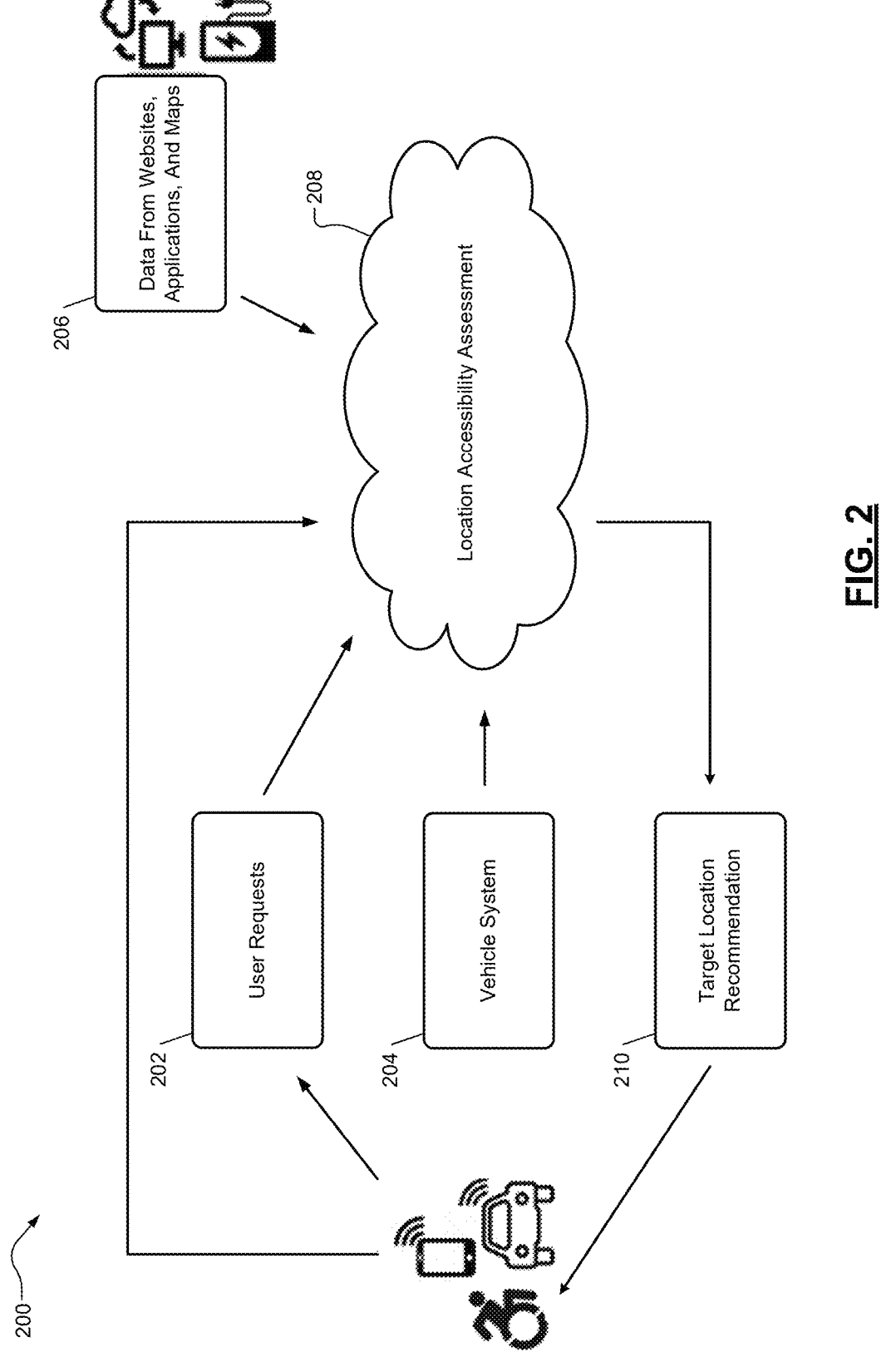
FIG. 2 is a representative data collection and assessment diagram in accordance with the present disclosure.

FIG. 2 shows a representative data collection and assessment diagram 200 including user requests 202, a vehicle system 204, website, application and map data 206, a location accessibility assessment 208, and a target location recommendation 210. The user requests may include vehicle information, accessibility preferences, types of requests, locations and expected and/or desired timing, routes, etc. The accessibility preferences may include any of the features referred to herein.

The vehicle system 204 may be the vehicle systems one or more of the vehicles 102 of FIG. 1 and/or the vehicle 1100 of FIG. 11. The vehicle system 204 monitors charging status and expected and/or predicted path of host vehicle. The vehicle system 204 monitors weather conditions and estimates driving range and makes updated recommendations for target locations.

The location accessibility assessment is made via one of the accessibility modules of FIGS. 1 and 11. The accessibility module performs AI ML including machine vision and natural language processing. The accessibility module: receives requested information from the user; searches databases to identify points of interest near a current host vehicle location and/or along an expected and/or predicted route of the host vehicle; searches databases and identifies information related to accessibility features of target locations, creates accessibility profile for each potential target location; compares accessibility profiles of target locations to user accessibility preferences to provide recommendation; and updates profile assessments and accessibility features based on user feedback.

The location accessibility assessment is performed based on data collected from websites and applications (e.g., third party charging station applications, third party travel planning applications, third party mapping applications, etc.). The applications may include charging station locating applications, travel booking sites, and/or other business applications. The websites may include crowd sourcing websites for accessible target locations. The applications may include applications with street view images. A recommendation is provided to the user based on the location accessibility assessment.

Figure 3:
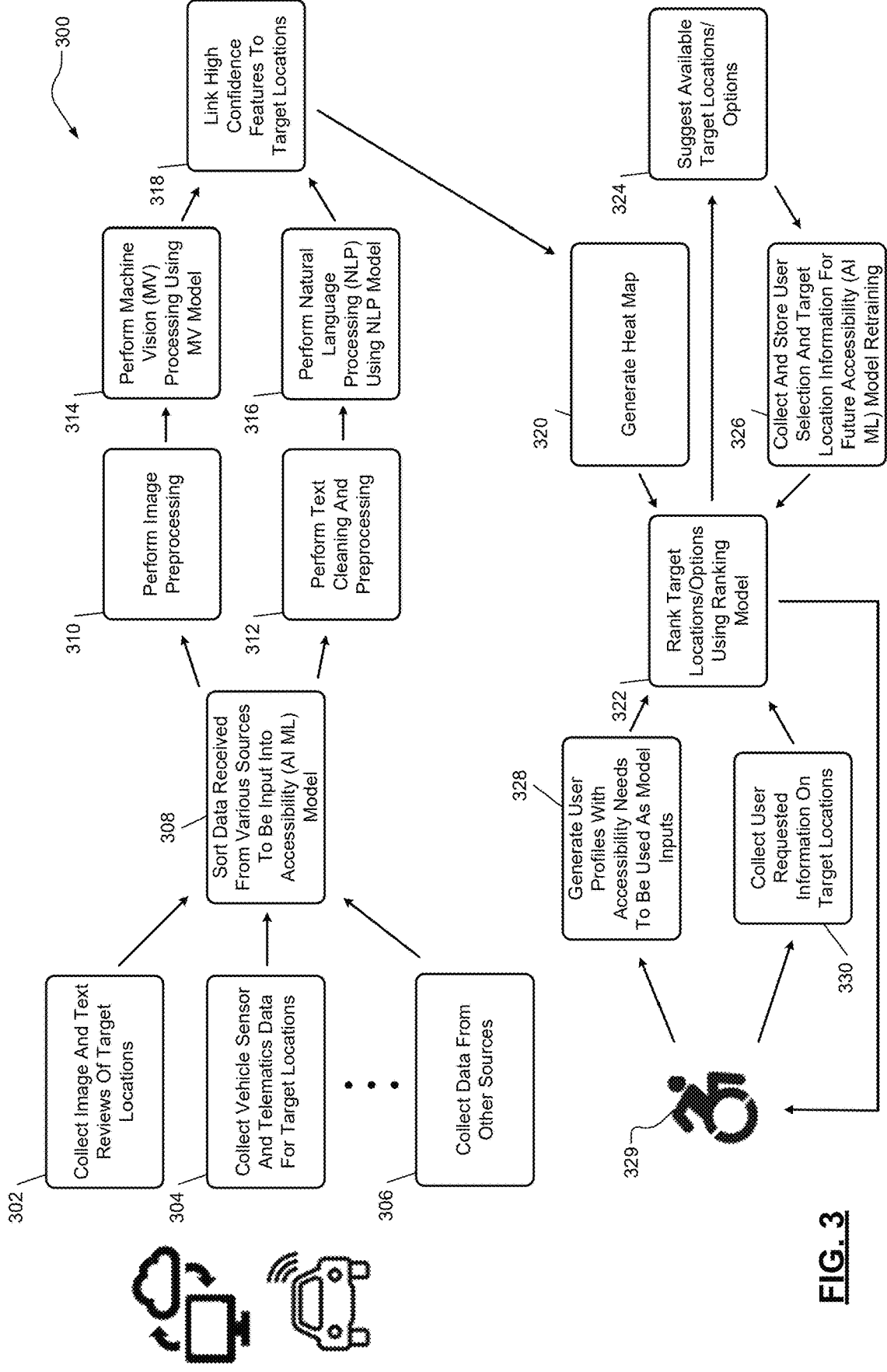
FIG. 3 is an accessibility process diagram in accordance with the present disclosure.

FIG. 3 shows an accessibility (or AI ML) process diagram 300. The following operations may be performed by any of the accessibility modules disclosed herein. At 302, the accessibility module collects image and text reviews of target locations.

At 304, the accessibility module collects vehicle sensor and telematics data for potential (or possible) target locations. This may include data from the host vehicle and from other vehicles. This data may be obtained from the vehicles and/or from one or more other sources, such as cloud-based servers, third party servers, a back-office service, etc.

At 306, the accessibility module collects other data from other sources, such as data from other cloud-based servers. The other data may include data regarding charging stations or other destinations. The other data may include data regarding businesses nearby target destinations. In an embodiment, when charging station target location data is collected, other data regarding nearby hotels, restaurants, shopping malls, rest areas, etc. may also be collected.

At 308, the accessibility module sorts the collected data from the various sources such that the data is able to be provided to an accessibility (AI ML) model, which may be implemented using one or more neural machine learning networks. Data collected from on-vehicle and cloud sources is sorted for preprocessing.

At 310, the accessibility module performs image preprocessing of images collected for the target locations (or destinations). At 312, the accessibility module performs text cleaning and preprocessing.

At 314, the accessibility module performs MV processing of the collected images using a machine vision model to identify high confidence features. At 316, the accessibility module performs NLP of the collected text using a NLP model to identify high confidence features.

At 318, the accessibility module links high confidence features to target locations. The accessibility module implements an accessibility discovery model for the possible destinations and creates accessibility profiles for the destinations. The accessibility profiles may be generated for destinations in regions along a route being traveled and specified by the user. The accessibility module may automatically generate accessibility scores for stations based on station profiles and how the profiles match the accessibility needs specified by the user for the intended location or route, as well as make recommendations based on the accessibility scores and intended time of travel. An example of the process to link the high confidence features to target locations is shown and described with respect to FIG. 8.

To generate the recommendations, the accessibility module evaluates features of a station as inputs to produce a station accessibility profile. This may include one or more of the following: determining a type of charging system needed by the host vehicle and available at each charging station, hours of operation of the charging stations, presence of accessibility symbols in parking spaces, sizes of parking spaces, hands-free charging capability, presence of attendant, whether there is an accessible path from vehicle to charging port, whether there is an accessible location of user interface and cable port, height requirements of user, accessible communication features of the charging station and user interface, whether there is a covered parking spot for charging, whether there are accessible restrooms, whether there are grassy areas for service animals, etc. Although these features are primarily directed to charging stations, similar features may be assessed for non-charging station destinations nearby and/or nearby the route being followed.

To generate the recommendations, an algorithm is used to search for and receive relevant information to identify precise station locations and assess the accessibility features from online sources, such as EV charging station websites, community and social media websites, websites that contain satellite and street view images, and crowd sourcing websites for accessible charging stations. MV processing and NLP may be used to evaluate collected images, comments from reviews, and website text information. This may be done at 314 and 316.

To generate the recommendations, an algorithm may be used to acquire and process data from vehicle data sources, such as from telematics data sources and cameras. Surrounding environments of vehicles may be scanned to parse through the accessibility model to detect accessibility and learn physical features to use as inputs to the station accessibility profile.

The accessibility discovery model may be used to determine whether there are restaurants near charging stations of interest, whether there is a shopping malls (or centers) near the charging stations of interest, whether there is wheelchair access on a certain floor of a business (e.g., a hotel), whether there is a handicap lift at a swimming pool of a hotel, whether there are points of interest near the charging stations of interest, etc. Machine vision, vehicle telematics, camera data, and/or other algorithms may be used to determine exterior features and interior features of businesses including the charging stations of interest and businesses nearby and/or along a route being traveled.

At 314 and 316, MV and NLP is used to assess station functionality and identify quality issues with the station, such as damaged components, non-functioning chargers, when the charger was last used, the power output of the charger, temperature of the charger, and other relevant information and provides an alert to the station owner in the case that maintenance is required.

Recommendations are generated based on this information. The accessibility module may refrain from recommending charging stations that have damaged components, non-functioning chargers, and/or other issues. The accessibility module may refrain from recommending a charging station which has not charged a vehicle for an extended period of time (e.g., more than 4 months). The accessibility model applies filters to block recommendations to stations that are down for maintenance or have been identified as having quality issues.

In an embodiment, the accessibility model is used to continuously or periodically search for and provide new input information. The accessibility module continues to learn, and updates accessibility scores of the user and host vehicle for potential destinations including potential charging stations.

A user accessibility profile may be created based on the host vehicle, the charger type, and the desired features that are specified by the user. The desired features are used as inputs to create a customized accessibility score for each of the charging stations in a region or along a travel route specified by a user. The scores are provided by the accessibility module to the user as outputs and suggestions. A user may provide real-time data to the accessibility system regarding the accessibility features of a station, such as comments, images, and feedback to update the accessibility profile of the charging station. The accessibility profile may be created at 318.

In an embodiment, recommendations for charging stations along a route are generated based on estimated mileage calculation for the host vehicle. In an embodiment, recommendations for charging stations along a route are updated based on a real-time battery state-of-charge of the host vehicle.

In another embodiment, the accessibility module uses an accessibility discovery model for public places and creates accessibility profiles for places such as hotels, shopping centers, and rest areas in a region or travel route specified by a user. The accessibility module may automatically generate accessibility scores for the places (or possible destinations) based on the profiles and how well the profiles match accessibility needs specified by the user. The accessibility module evaluates features of places and produces the accessibility profiles of the places. The features may include: presence of accessibility symbol in parking spaces; size of parking spaces; accessible bathroom needs; grassy area needs for service animals; and presence of ground floor accessible rooms.

The accessibility module may execute an algorithm to search for and receive relevant information from online sources to assess the accessibility features of destinations. The online sources may include retailer websites, community and social media websites, websites that contain satellite and street view images, and crowd sourcing websites for accessible public places. This may be done using MV processing and NLP to evaluate images, comments from reviews, and website text information. This may be done at 314 and 316.

A user profile is created based on the desired features that are specified by the user and is used as inputs to create customized accessibility scores of public places in a region or a travel route specified by a user. The scores are provided to the user as suggestions. The scores may be outputted or shown via a display. This may be done at 320.

The accessibility system creates a customized accessible travel itinerary for a user based on accessibility scores of desired places along a travel route specified by the user. Examples of the places are charging stations, hotels, rest areas, and shopping centers. This may be accomplished using accessibility discovery models for the places that produce accessibility scores based on how well the features of the places match the user's accessibility profile and the travel route.

The accessibility module is configured to make reservations for places based on a travel schedule and upon confirmation by the user. This may include making reservations at one or more charging stations along a route such that when the host vehicle pulls into the charging station a spot is available and waiting for the user. The reservations may be made prior to and/or while the host vehicle is enroute to a final destination. The accessibility module may collect and/or store user payment information and provide this information to retailers with permission from the user. This includes providing the payment information to a charging station and/or other retail business.

Figure 9:
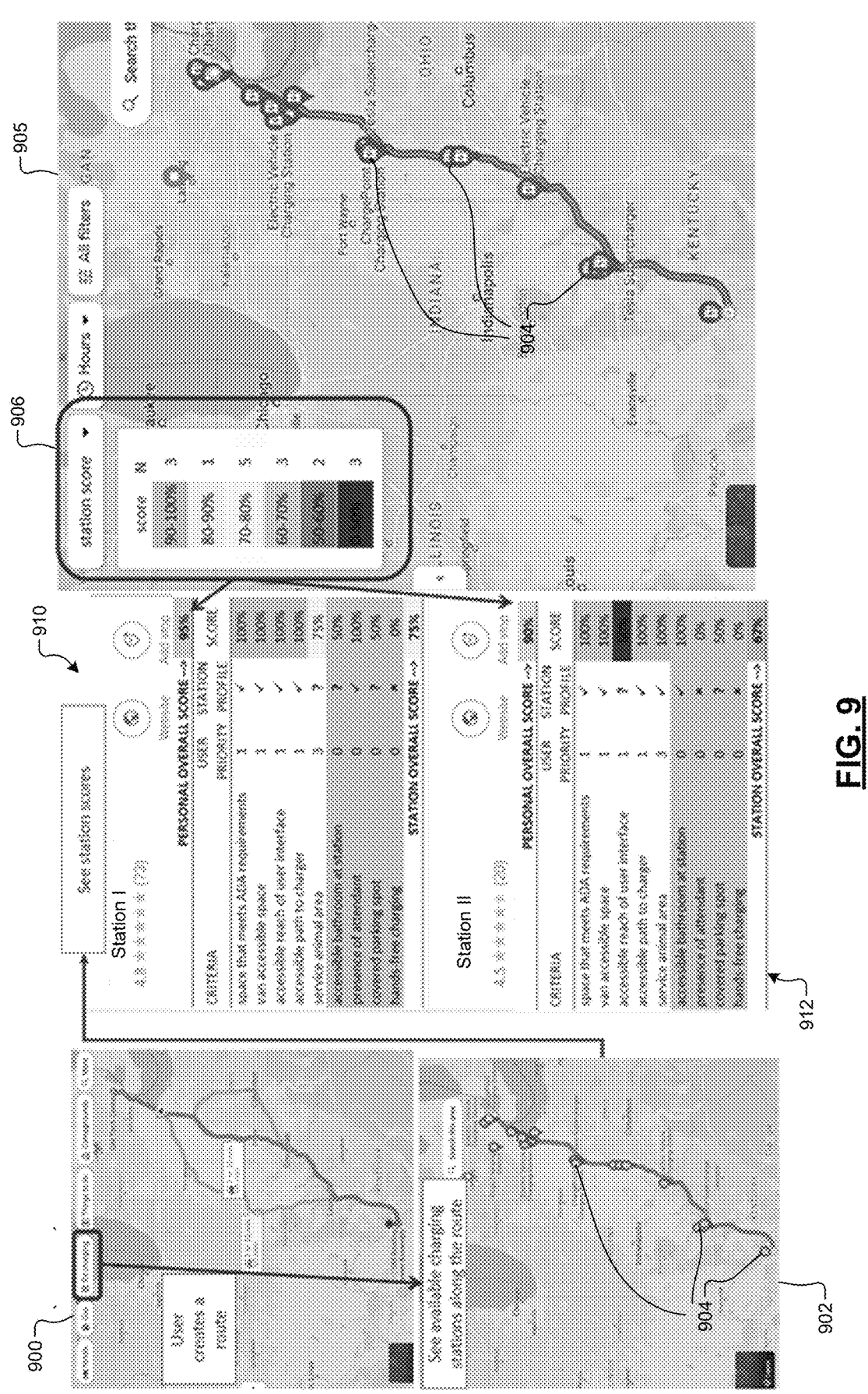
FIG. 9 is a mapping and ranking diagram illustrating generation of a heat map corresponding to rankings of target locations based on a user profile and station profiles in accordance with the present disclosure.

At 320, the accessibility module generates a heat map. An example of a heat map is shown in FIG. 9. At 322, the accessibility module ranks target locations and options using a ranking model. The ranking model may include an order of the possible destinations for each type of destination based on the generated scores of the destinations. The ranking is specific to the user and would be different for a different user.

At 324, the accessibility module suggests available target locations and options. This may include making any of the above-stated recommendations. The recommendations may be generated based on a user profile, charging station profiles, battery life expectancy, battery state of charge, length of time to charge power source of host vehicle, charging requirements of host vehicle, number of charging locations (or chargers) at each target location, expected wait times to be able to recharge power source of host vehicle at each charging location, expected charge time at each charging location, and other features of each charging location.

At 326, the accessibility module collects and stores user selection and target location information for future accessibility (AI ML) model retraining.

At 328, the accessibility module generates user profiles with accessibility needs to be used as model inputs. This is based on information collected from a user 329. At 330, the accessibility module collects user requested information on target locations from the user 329. An example method for generating user profiles and saving selected suggestions (or recommendations) is shown and described with respect to FIG. 10.

Figure 4:
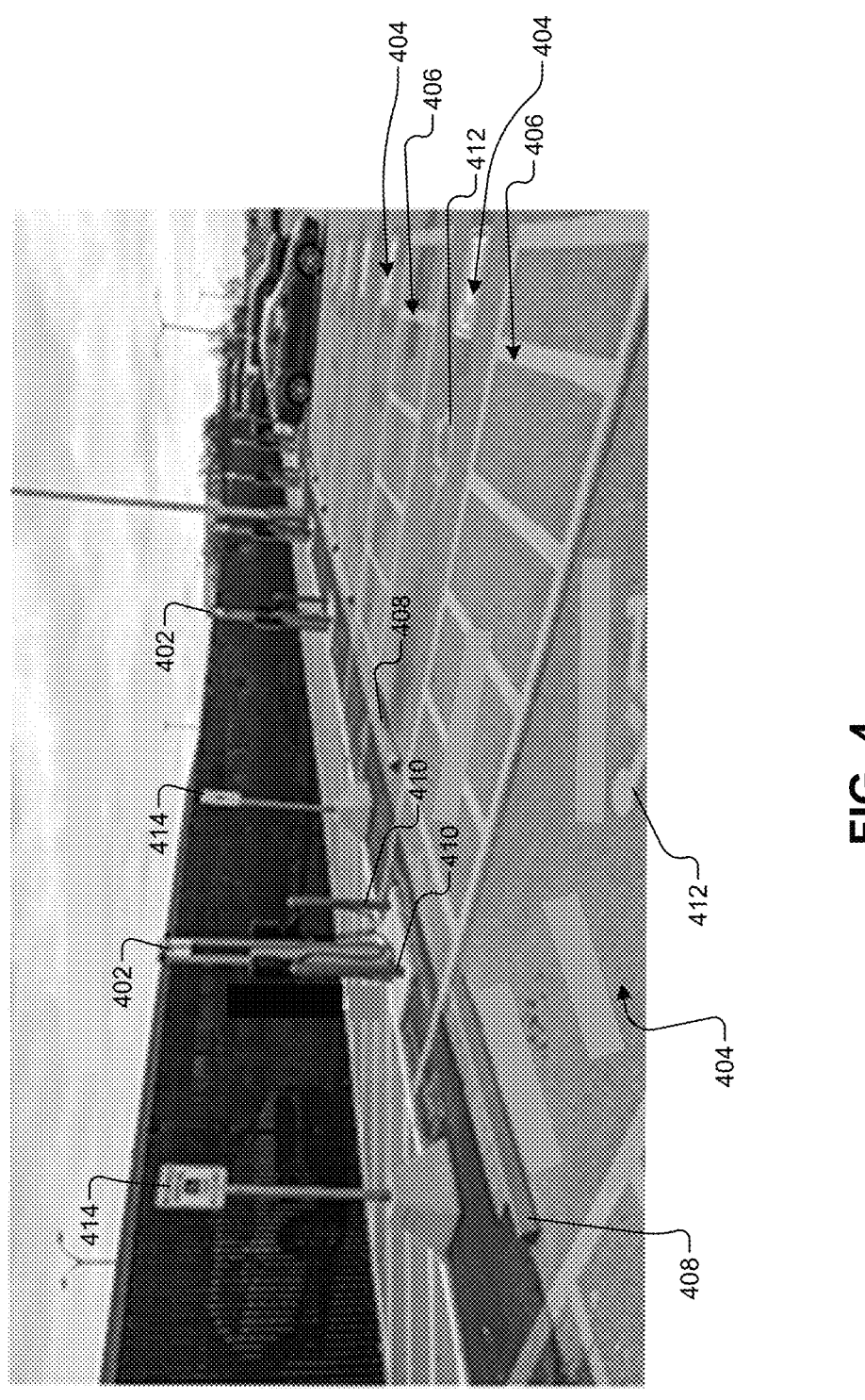
FIG. 4 is an image of an example charging location having certain features.
Figure 5:
FIG. 5 is image of another example charging location having certain features.
Figure 6:
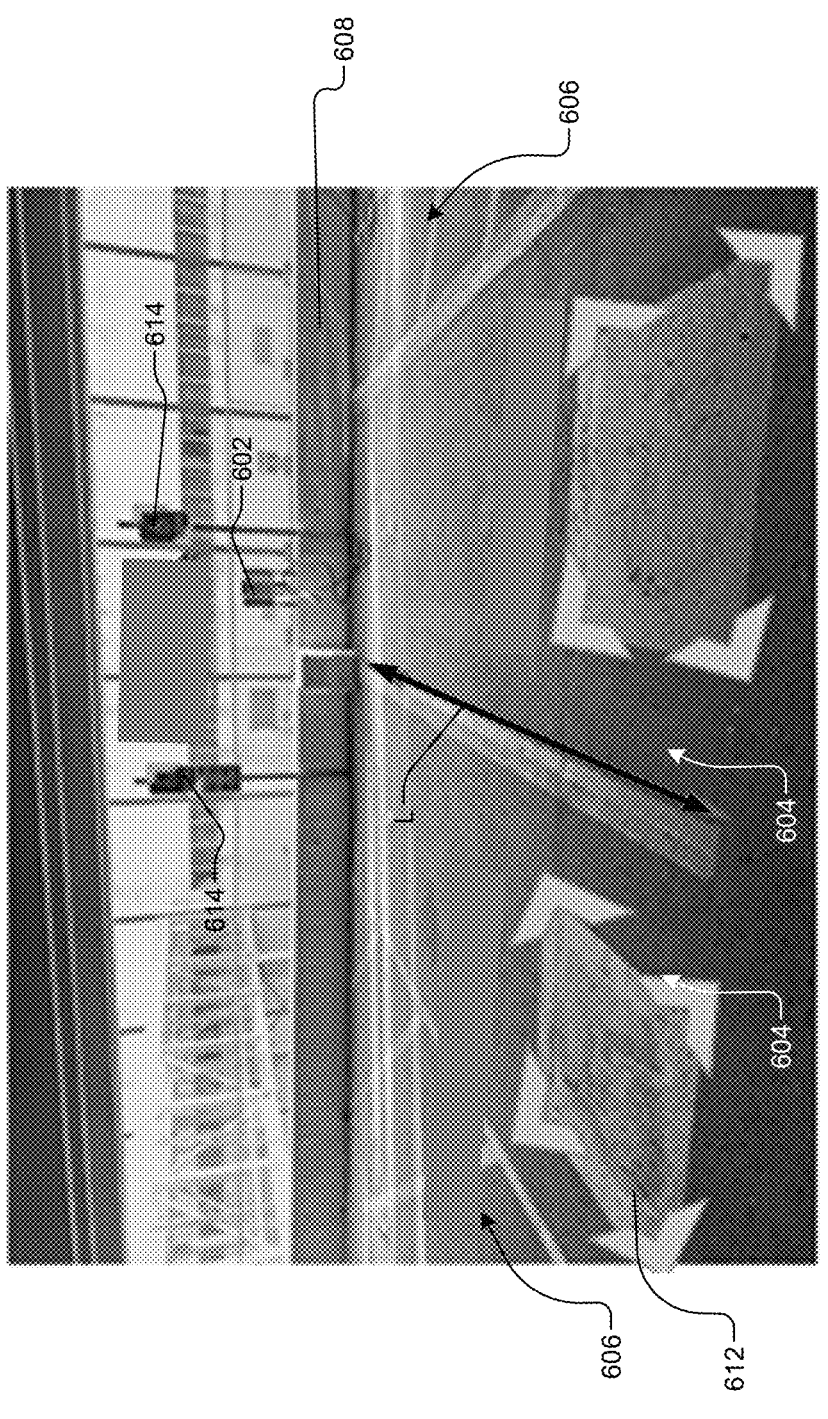
FIG. 6 is image of another example charging location having certain features.
Figure 12A:
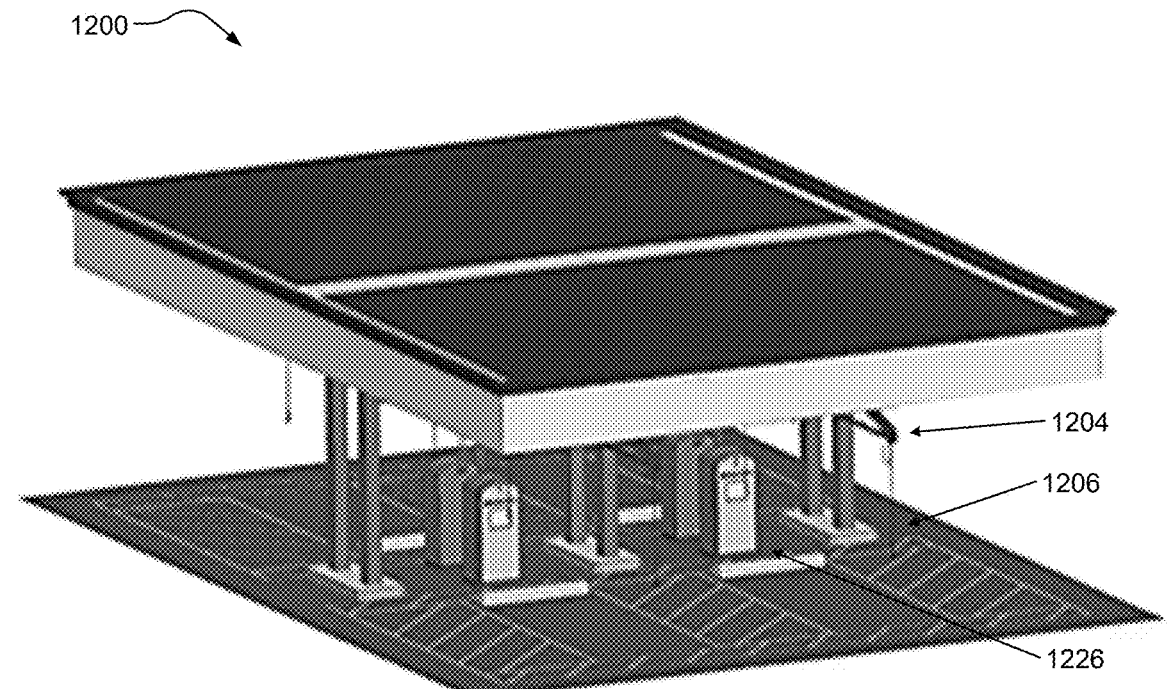
FIG. 12A is an isometric view of an example vehicle charging system including a charging apparatus movable on tracks.
Figure 12B:
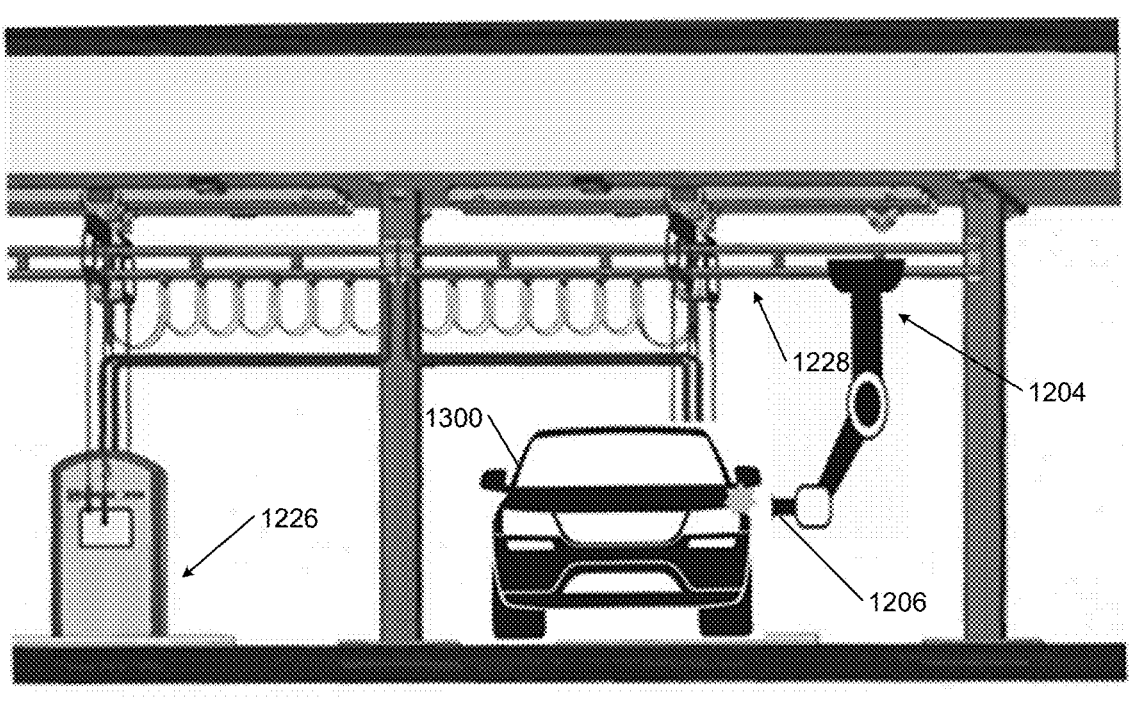
FIG. 12B is a side view of the vehicle charging system of FIG. 12A.

The following FIGS. 4-6 are provided as examples of charging locations to illustrate differences in some features of different charging locations. FIGS. 12A and 12B show yet another example charging location (or commercial charging station). The examples described herein are applicable to all of these charging locations and other charging locations. The charging locations of FIGS. 4-7 show some example features. Charging stations, in general, may include i) the same features as shown in FIGS. 4-7 and/or other features, ii) the same types of features as that shown in FIGS. 4-7 but have different feature characteristics, and/or iii) other types of features, some of which are referred to herein. Any of these features may be assessed when creating charging location and/or station profiles. A heat map may be generated for charging stations along a route. An example heat map is shown in FIG. 9. Image analysis of the images of FIGS. 4-7 and/or other images of charging stations along a route may be performed and the provided analysis results may be used as inputs to generate an accessibility score for each of the charging locations. The scores may then be used to create the heat map.

FIG. 4 shows an image of an example charging location having certain features. The charging location includes chargers 402, vehicle parking locations 404 used when charging, access aisles 406 between the parking locations 404, different types of barriers 408, 410, handicap markings 412, and signage 414. The barriers 408 prevent vehicles from moving too close to and hitting the signage 414. The barriers 410 prevent vehicles from moving too close to and hitting the chargers 402. The charging location does not include overhead coverage and does not have an attendant. The chargers 402 are located between the parking locations 404 and in alignment with the access aisles 406. Each charger 402 may be used to charge vehicles in two of the parking locations 404. This allows a vehicle to pull in forward or rearward and be able to be charged regardless of which side of the vehicle the charge port is on.

FIG. 5 shows another example charging location having certain features. The charging location includes a charger 502, a vehicle parking location 504, an access aisle 506, a barrier 508, a handicap marking 512, and a sign 514. The charging location does not include overhead coverage and does not have an attendant. A charging plug is at a handle height H1 when stowed on the charger 502. The sign 514 is at a height H2. The charger 502 is on one side of the parking location 504 and thus requires a vehicle to pull in forward or rearward depending on which side of the vehicle the charge port is on. The barrier 508 is a curb that runs along one side of the parking location 504 and prevents a vehicle from driving over landscaping and/or getting too close to the charger 502. Thus, there is a lack of aisle space (or access space) on the side of the parking location near the charger 502. The charger 502 has a large screen 520, which may be easy to read.

Figure 7:
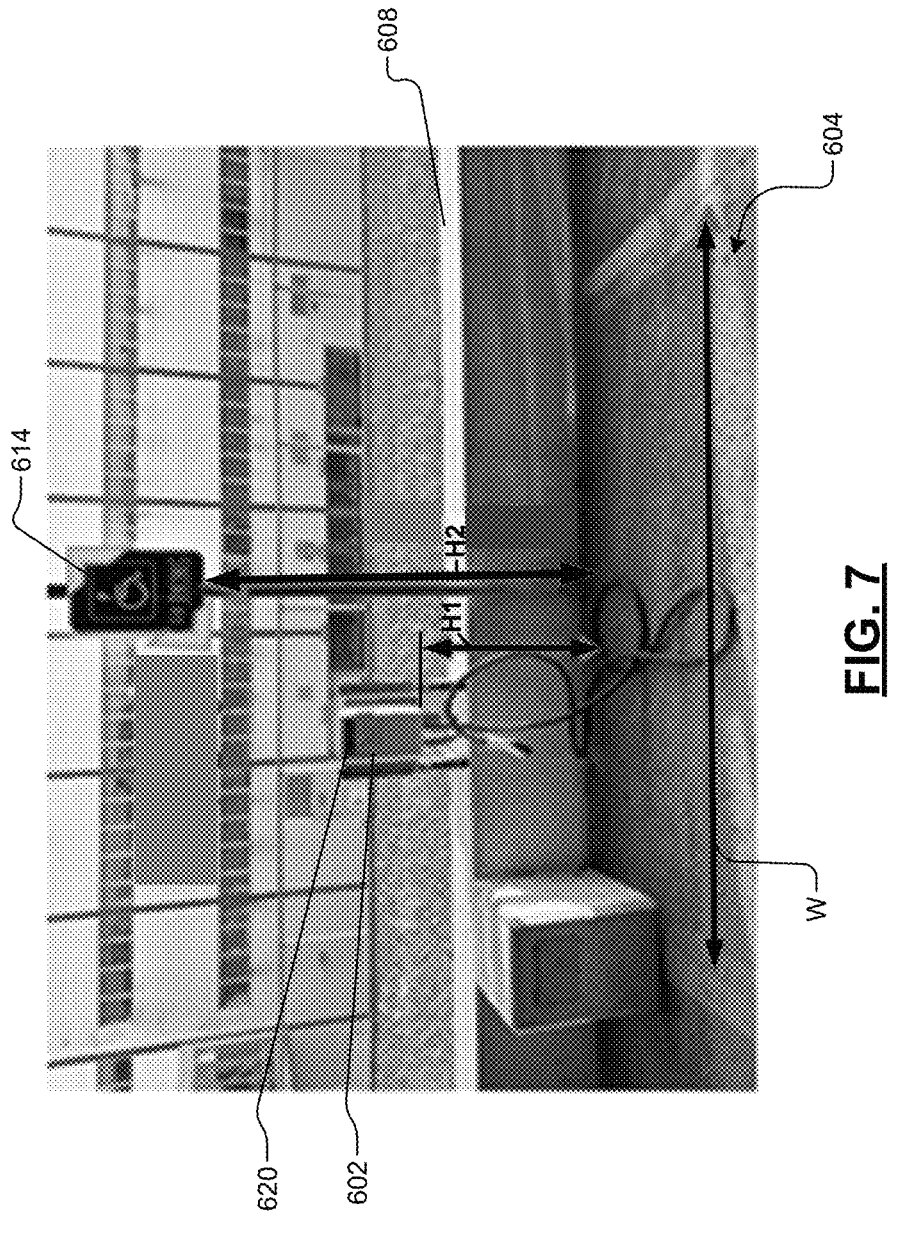
FIG. 7 is a closeup image of a charger at the charging location of FIG. 7.

FIGS. 6-7 show another example charging location having certain features. The charging location includes a charger 602, vehicle parking locations 604, access aisles 606, a barrier 608, a handicap marking 612, and signage 614. The charging location does not include overhead coverage and does not have an attendant. A length L of the vehicle parking location is shown in FIG. 6. A width W of the vehicle parking location 604 is shown in FIG. 7. A height H1 of the bottom of the charger 602 is shown and a height H2 of the sign 614 is shown. The charger 602 is located at the front end of one of the parking locations 604, which provides easier access to the charging cable when a host vehicle is parked on the one of the parking locations 604. Access is more difficult when the host vehicle is parked on the other one of the parking locations 604. The charger 602 has a small screen 620 that may be difficult to read. There is no aisle between the parking locations 604.

Figure 8:
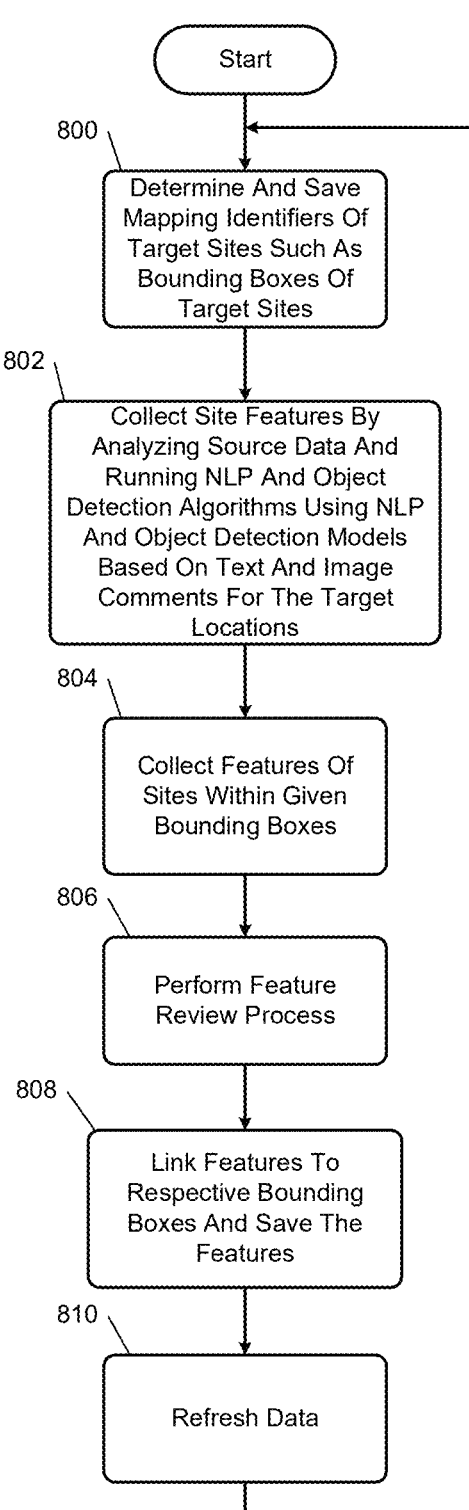
FIG. 8 illustrates a method of linking features to target locations to be used in recommendations in accordance with the present disclosure.

FIG. 8 shows a method of linking features to target locations to be used in recommendations. The method may be performed by any of the accessibility modules disclosed herein.

At 800, the accessibility module determines and saves mapping identifiers of target sites such as bounding boxes of target sites based on a vehicle current location. A map may be generated showing a route to be followed and mapping identifiers may be displayed on the map and point out the locations of the target sites. The mapping identifiers may include circles or polygons and surround (or encircle) certain geographical locations associated with target sites. Based on a known, predicted, and/or determined final end destination, the accessibility module may determine possible charging station options along a route from a current vehicle location to the final end destination. Depending on charging station availability and the scores of the available charging stations, a new possible route to the final end destination may be determined. Thus, the vehicle may be rerouted. This information may be provided to the user during this operation or during another operation. This information may be provided subsequent to performing this method and during operation 320 of FIG. 3.

At 802, the accessibility module collects site features by analyzing source data and running NLP and object detection algorithms using NLP and object detection models. The source data may include data from onboard and/or offboard vehicle sensors, data from other vehicles, source data from websites, third party application data, data from cloud-based databases, data from backoff databases, etc. The analyzing may be based on text and image comments for the target locations.

At 804, the accessibility module collects features of sites within given bounding boxes. At 806, the accessibility module performs a feature review process. This may include geotagging information. Each target site is given or has a unique identifier. The collected information is tagged to the unique identifiers for the target sites within the bounding boxes.

At 808, the accessibility module links features to respective bounding boxes and saves the features.

At 810, the accessibility module refreshes data. Data is continuously updated. Queries for updated information may be periodically performed to collect updated data from on-board data sources (e.g., sensors and memory) and off-board data sources such as those referred to herein. This is done to facilitate maintenance of relevant up to date data Operation 800 may be performed subsequent to operation 810.

FIG. 9 shows a mapping and ranking diagram illustrating generation of a heat map corresponding to rankings of target locations based on a user profile and station profiles. The mapping and ranking diagram includes accessibility scoring along a user specified route. Three maps are shown including a first map 900 where a user is specifying the route, a second map 902 where available charging stations along the route are identified and shown with circular icons 904 (each having a charger symbol), and a third map (or heat map) 905 where the available charging station icons 904 are colored differently, shaded differently and/or have other distinguishing aspects to indicate the different score levels of the available charging stations. In the example shown, the icons may be shaded differently according to a ranking scale (or key) 906 in the upper left corner of the map, wherein each shade has a respective score range (e.g., 0-50%, 50-60%, 70-80% and 90-100%). The ranking scale 906 also includes the number of available charging stations in each score range. Although the icons shown in FIG. 9 have a same shading, the icons may be shaded differently.

The mapping and ranking diagram further includes tables 910, 912 for scoring for two example stations Station I and Station II. The tables 910, 912 may be shown for example when the user taps or clicks on the corresponding icon on, for example, the second map 902 or the third map 904. Each of the tables 910, 912 includes four columns of information including: a list of criteria including features of charging stations; user priority values for each feature; station profile status indicators for each feature; and a score for each feature. Each feature (or criterion) is given a user priority ranking, a station profile status indicator, and a score. An overall score for each station is also provided based on the scores of the criteria. The overall score may be a weighted sum of the scores of the criteria. The scores of the criteria may be weighted based on the user priority ranking and the station profile status indicator. This weighting may include multiplying the scores of the criteria by respective values between 0-1. The weighted percentages may then be added to provide the overall score.

As an example, a criterion may be given a user priority ranking of a 1 if this criterion is of high priority or a 3 if the criterion is of low priority. A criterion may be given a user priority ranking of 0 if the user priority ranking is unknown or not applicable. As an example, if a charging station has and/or satisfies a particular criterion, then a check mark is provided as a station profile status indicator. If it is unknown whether a charging has and/or satisfies a particular criterion, then a question mark is provided as a station profile status indicator. If a charging station does not have and/or satisfy a criterion, then an x mark is provided. D The tables 910, 912 show example criteria. Other criteria may be included. In the tables 910, 912 shown, the criteria includes space that meets ADA requirements, van accessible space, accessible reach of user interface, accessible path to charger, service animal area, accessible bathroom at station, presence of attendant, covered parking spot, and hands-free charging. The tables 910, 912 also include a ranking of each station. For example, table 910 of Station I has a 4.8 star ranking and table 912 of Station II has a 4.5 star ranking. The rankings in the example are on a 5 star scale, where 5 stars is the highest rank value and 1 star is the lowest rank value. Buttons to go to the station's website and to add the station as a stop along the route are also provided and may be selected by the user.

Figure 10:
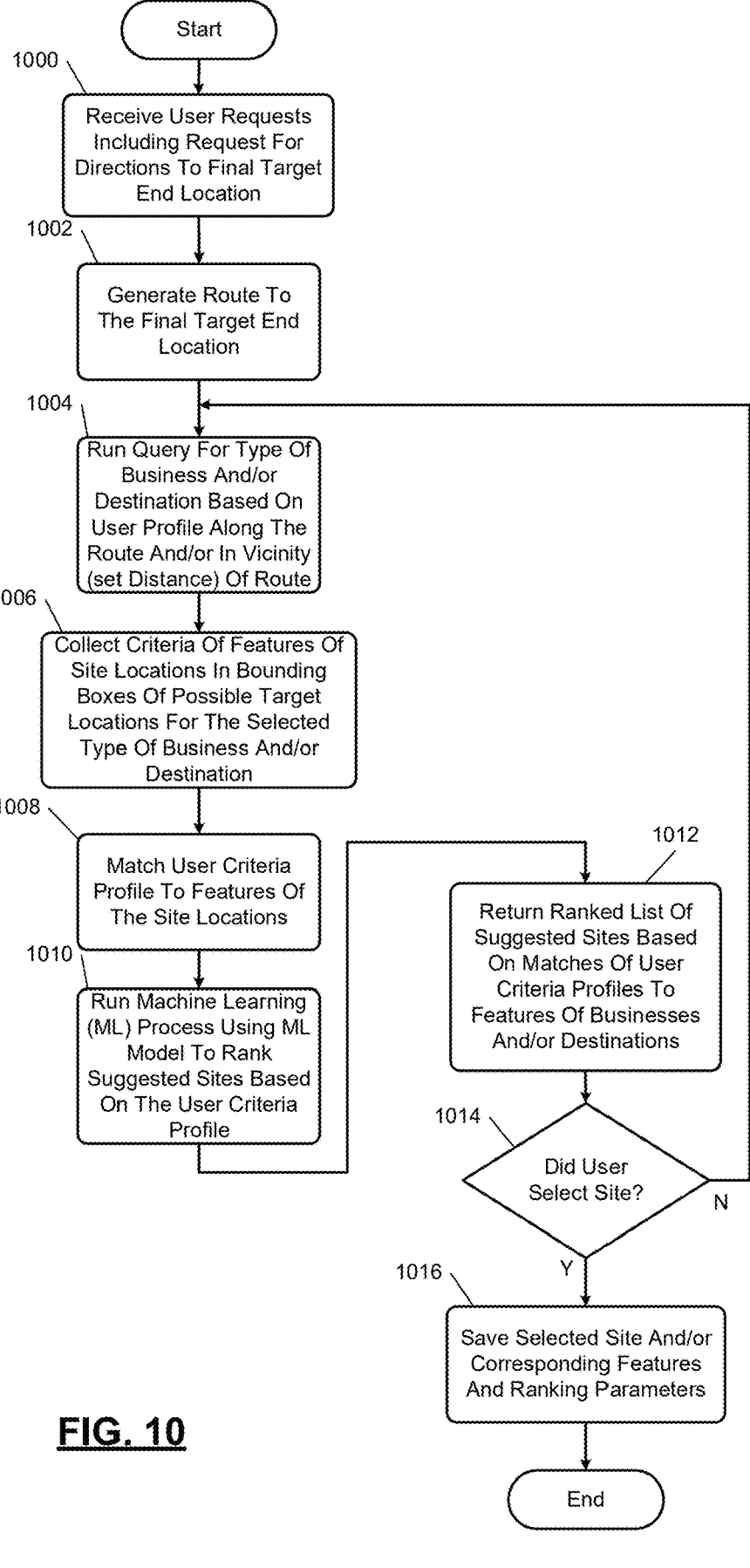
FIG. 10 illustrates a method of generating user profiles and saving user selected options and corresponding ranking parameters in accordance with the present disclosure.

FIG. 10 shows a method of generating user profiles and saving user selected options and corresponding ranking parameters. The method may be performed by any of the accessibility modules disclosed herein.

At 1000, the accessibility module receives user requests including a request for directions to a final target end location. At 1002, the accessibility module generates a route from a current location to the final target end location.

At 1004, the accessibility module runs a query for types of businesses and/or destinations based on a user criteria profile along the route and/or in vicinity (set distance) of route. This may include charging stations and/or other types of businesses and/or destinations such as restaurants, hotels, shopping malls, rest areas, etc. At 1006, the accessibility module collects criteria including features of site locations in bounding boxes of possible target locations for the businesses and/or destinations.

At 1008, the accessibility module matches the user criteria profile to the features of the site locations. At 1010, the accessibility module runs ML process using a ML model to rank suggested sites based on the user criteria profile. At 1012, the accessibility module returns a ranked list of suggested sites based on matches of user criteria profiles to features of the businesses and/or destinations.

At 1014, the accessibility module determines whether the user selected a site. Operation 1016 may be performed if the user selected one of the sites, otherwise operation 1004 may be performed. At 1016, the accessibility module saves selected site and corresponding features and ranking parameters. The method may end after operation 1016.

The above-described operations of FIGS. 8 and 10 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

FIG. 11 shows an example vehicle 1100 including a vehicle control system 1101 with an accessibility module 1102, which may be configured as any of accessibility modules referred to herein. The vehicle 1100 may be a partially or fully autonomous vehicle. The vehicle control system 1101 may include a power source 1103 having a control module 1104, battery packs 1105, and sensors 1106. The battery packs 1105 are charged via chargers at charging stations, such as any of the charging stations referred to herein. The vehicle 1100 further includes a vehicle control module 1107, an infotainment module 1108 and other control modules 1109.

The modules 1102, 1104, 1107, 1108, 1109 may communicate with each other via one or more buses 1110, such as a controller area network (CAN) bus and/or other suitable interfaces. The vehicle control module 1107 may control operation of vehicles systems. The vehicle control module 1107 may include a mode selection module 1112, a parameter adjustment module 1114, as well as other modules 1116 (e.g., an active safety management module). The mode selection module 1112 may select a vehicle operating mode. The parameter adjustment module 1114 may be used to adjust parameters of the vehicle 1100.

The vehicle 1100 may further include: a memory 1118; a display 1120; an audio system 1122; one or more transceivers 1123 including sensors 1126; and a navigation system 1127 including a global positioning system (GPS) receiver 1128. The sensors 1126 may include sensors, cameras, objection detection sensors, temperature sensors, accelerometers, vehicle velocity sensor, and/or other sensors. The GPS receiver 1128 may provide vehicle velocity and/or direction (or heading) of the vehicle and/or global clock timing information.

The memory 1118 may store sensor data 1130 and/or vehicle parameters 1132, power source parameters 1134, and applications 1136. The applications 1136 may include applications executed by the modules 1102, 1104, 1107, 1108, 1109. The applications 1136 may include any of the applications referred to herein. Although the memory 1118 and the vehicle control module 1107 are shown as separate devices, the memory 1118 and the vehicle control module 1107 may be implemented as a single device.

The vehicle control module 1107 may control operation of an engine 1140, a converter/generator 1142, a transmission 1144, a window/door system 1150, a lighting system 1152, a seating system 1154, a mirror system 1156, a brake system 1158, electric motors 1160 and/or a steering system 1162 according to parameters set by the modules 1102, 1104, 1107, 1108, 1109. The vehicle control module 1107 may set some of the parameters based on signals received from the sensors 1126. The vehicle control module 1107 may receive power from the power source 1103, which may be provided to the engine 1140, the converter/generator 1142, the transmission 1144, the window/door system 1150, the lighting system 1152, the seating system 1154, the mirror system 1156, the brake system 1158, the electric motors 1160 and/or the steering system 1162, etc. Some of the vehicle control operations may include unlocking doors of the window/door system 1150, enabling fuel and spark of the engine 1140, starting the electric motors 1160, powering any of the systems 1150, 1152, 1154, 1156, 1158, 1162, and/or performing other operations as are further described herein.

The engine 1140, the converter/generator 1142, the transmission 1144, the window/door system 1150, the lighting system 1152, the seating system 1154, the mirror system 1156, the brake system 1158, the electric motors 1160 and/or the steering system 1162 may include actuators controlled by the vehicle control module 1107 to, for example, adjust fuel, spark, air flow, steering wheel angle, throttle position, pedal position, door locks, window position, seat angles, etc. This control may be based on the outputs of the sensors 1126, the navigation system 1127, the GPS receiver 1128 and the above-stated data and information stored in the memory 1118.

The vehicle control module 1107 may determine various parameters including a vehicle speed, an engine speed, an engine torque, a gear state, an accelerometer position, a brake pedal position, an amount of regenerative (charge) power, an amount of boost (discharge) power, an amount of auto start/stop discharge power, and/or other information, such as priority levels of source terminals of the power source 1103, power, current and voltage demands for each source terminal, etc. The vehicle control module 1107 may share this information and the vehicle operating mode with the control module 1104. The control module 1104 may determine other parameters, such as: an amount of charge power at each source terminal; an amount of discharge power at each source terminal; maximum and minimum forces at cells, blocks, packs, and/or groups; maximum and minimum voltages at source terminals; maximum and minimum voltages at power rails, cells, blocks, and/or packs; state of charge values of cells, blocks, and/or packs; temperatures of cells, blocks, and/or packs; current values of cells, blocks, and/or packs; power values cells, blocks, and/or packs; etc. The control module 1104 may determine connected configurations of the cells and corresponding switch states based on the parameters determined by the vehicle control module 1107 and/or the control module 1104.

The vehicle control module 1107 may autonomously drive the vehicle 1100 to follow a selected route including stopping at user elected businesses including charging stations, restaurants, hotels, shopping malls, etc. The vehicle control module 1107 may provide accessibility related information to the user via, for example, the display 1120 including the tables, rankings, scores, etc. referred to herein and the like. The vehicle control module 1107 may provide navigation instructions to the user based on the selected route and destinations. The user may interact with the display 1120, audio system 1122, and/or other device(s) to provide requests and make selections.

FIGS. 12A-12B (collectively FIG. 12) show an example vehicle charging system 1200 that includes a charging apparatus 1204 having a charging plug 1206 connected to a power source 1226. In such examples, the charging apparatus 1204 and the charging plug 1206 may function similarly as the charging apparatus 1204 and the charging plug 1206 as explained above. For example, the charging apparatus 1204 may be controlled to move adjacent to a charging port of the vehicle 1300 located in a nearby parking spot. In such examples, the charging apparatus 1204 is moved along a track system 1228 coupled to a canopy of the system 1200.

In various embodiments, any one of the charging systems herein may include a movable, robotic arm for assisting users to move a charging plug and align the charging plug with a charging port of a vehicle. By employing the movable, robotic arm, the amount of force required by users to move a charging plug and/or cable may be reduced as compared to manually moving the charging plug and/or cable.

The examples disclosed herein: enable greater mobility and independence for customers (or vehicle users) with accessibility needs; provide accurate information on accessibility features of target locations and surrounding points of interest; and increase customer safety and security.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system of a vehicle, the vehicle system comprising:
    a transceiver configured to communicate with a distributed communications network to collect source data from a plurality of sources;
    an accessibility module configured to
        receive a request for a final destination from a user,
        determine a route from a current location to the final destination,
        obtain user criteria information for features of a plurality of destinations along the route,
        collect the source data via the transceiver and regarding the features of the plurality of destinations,
        based on the source data and the user criteria information, score each of the plurality of destinations to generate a plurality of overall scores respectively for the plurality of destinations,
        match a user accessibility profile of user preferences to charging station accessibility profiles in vicinities of possible target destinations along the route, and, based on differences between the charging station accessibility profiles and the user preferences of the user accessibility profile, generate recommendations for charging stations at least one of nearby and along the route, wherein each of the charging station accessibility profiles comprises respective i) user priority rankings for the features as ranked by the user, ii) feature scores, and iii) an overall score, and wherein the overall score is a weighted sum of the feature scores for one of the recommended charging stations based on the user priority rankings,
        based on the plurality of overall scores, generate and display a heat map and a recommendation to the user, wherein the heat map is indicative of the plurality of overall scores respectively of the plurality of destinations, and wherein the plurality of overall scores are specific to the user, and
        receive an input selecting one of the plurality of destinations; and
    a vehicle control module configured, based on the selected destination, to at least one of guide the user to the selected destination or autonomously drive the vehicle to the selected destination.

2. The vehicle system of claim 1, wherein the plurality of destinations comprise a plurality of charging stations.

3. The vehicle system of claim 1, wherein the accessibility module is configured to
    access accessibility features from online sources including websites of the plurality of destinations, community and social media websites, websites containing satellite and street view images, and crowd sourcing websites;
    implement machine learning and natural language processing to evaluate images, comments and reviews, and website text information associated with the accessibility features;
    generate accessibility profiles of the plurality of destinations based on results of the machine learning and natural language processing; and
    generate the recommendation to the user for one of the plurality of destinations based on the generated accessibility profiles of the plurality of destinations.

4. The vehicle system of claim 1, wherein the accessibility module is configured, when collecting the source data, to perform an artificial intelligence machine learning process that searches the plurality of sources on the Internet to automatically identify and access the features of at least one of i) the plurality of destinations, and ii) locations of the plurality of destinations.

5. The vehicle system of claim 1, wherein the source data includes images, reviews, online information, website information, vehicle telematics data, and vehicle camera data.

6. The vehicle system of claim 1, wherein the accessibility module is configured to generate an accessibility profile for each of the plurality of destinations using machine vision and natural language processing of the source data.

7. The vehicle system of claim 1, wherein each of the charging station accessibility profiles comprises station profile status indicators.

8. The vehicle system of claim 1, wherein the accessibility module is configured to update user accessibility profile assessments and a station location accessibility profile database based on user feedback and periodic searches for the source data.

9. The vehicle system of claim 1, wherein:

the plurality of destinations comprise hotels, restaurants, rest areas, stores, shopping malls; and shopping centers; and the accessibility module is configured to generate a recommended accessible travel itinerary based on accessibility profiles of the plurality of destinations.

10. The vehicle system of claim 1, wherein the accessibility module is configured to implement machine learning and natural language processing to assess functionality and identify quality issues with one or more of the plurality of destinations, and generate the recommendation to at least one of i) not include the one or more of the plurality of destinations, ii) indicate issues of the one or more of the plurality of destinations, and iii) providing a low score for the one or more of the plurality of destinations.

11. The vehicle system of claim 1, wherein the accessibility module is configured to apply a filter to block a recommendation for a charging station that is down for maintenance.

12. The vehicle system of claim 1, wherein the accessibility module is configured to generate the recommendation for one of the plurality of destinations based on estimated mileage to the final destination and a state of charge of a power source of the vehicle.

13. The vehicle system of claim 1, wherein;

the accessibility module is configured to make a reservation at the selected destination for the user prior to or while the user is traveling along the route to the selected destination; and the selected destination is a charging station, and the reservation is for a parking spot at which the vehicle is to be charged.

14. The vehicle system of claim 1, wherein;

the accessibility module is configured to generate a customizable accessible travel itinerary for the user based on accessibility scores of places along the route specified by the user;

the accessibility module is configured to make reservations at the places based on a travel schedule and confirmation from the user; and the reservations are placed prior to the vehicle reaching a first destination along the route.

15. The vehicle system of claim 1, wherein:

each of the accessibility profiles includes accessibility features of a respective charging station; and the accessibility features of the accessibility profiles indicate whether the plurality of destinations include at least one of handicap markings and parking spot borders.

16. The vehicle system of claim 1, wherein:

each of the accessibility profiles includes accessibility features of a respective charging station; and the accessibility features include at least one of parking space widths and lengths, aisle widths, heights and lengths of charging cables, charging cable locations, sign heights, charger screen sizes, and charger screen parameters.

17. The vehicle system of claim 1, wherein:

each of the accessibility profiles includes accessibility features of a respective charging station; and the accessibility features of the accessibility profiles indicate whether the plurality of destinations include at least one of vehicle barriers, signs, and parking spot markings.

18. The vehicle system of claim 1, wherein:

each of the accessibility profiles includes accessibility features of a respective charging station; and the accessibility features of the accessibility profiles indicate whether the plurality of destinations at least one of i) include restrooms, and ii) are pet friendly.

19. The vehicle system of claim 1, wherein:

each of the accessibility profiles includes accessibility features of a respective charging station; and the accessibility features of the accessibility profiles indicate whether the plurality of destinations have at least one of a restaurant and one or more stores nearby.

20. The vehicle system of claim 1, wherein:

each of the accessibility profiles includes accessibility features; and the accessibility features comprise at least one of size of parking spot for charging the vehicle, ingress ease for the vehicle entering a parking spot, whether a charger plug is easy to access and plug in to the vehicle, ease in visibility and readability of a charger screen, ease in physically reaching the charger screen, whether a charger has a talk-to-text feature, whether an attendant is available on site to help, whether there are long charge chords at site, whether there are height and reach issues, and weight of charge cables.

* * * * *